US011343556B2

(12) United States Patent
Zeng et al.

(10) Patent No.: US 11,343,556 B2
(45) Date of Patent: May 24, 2022

(54) METHOD OF CONTROLLING A HORIZONTAL SCREEN OR VERTICAL SCREEN OF TELEVISION, DEVICE, AND STORAGE MEDIUM

(71) Applicant: SHENZHEN SKYWORTH-RGB ELECTRONIC CO., LTD., Shenzhen (CN)

(72) Inventors: Xianhui Zeng, Shenzhen (CN); Xitong Liu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/148,767

(22) Filed: Jan. 14, 2021

(65) Prior Publication Data

US 2021/0152868 A1 May 20, 2021

Related U.S. Application Data

(63) Continuation of application No. PCT/CN2020/129851, filed on Nov. 18, 2020.

(30) Foreign Application Priority Data

Nov. 19, 2019 (CN) .......................... 201911145223.6

(51) Int. Cl.
*H04N 21/41* (2011.01)
*H04N 21/414* (2011.01)
(Continued)

(52) U.S. Cl.
CPC ....... *H04N 21/4126* (2013.01); *G06F 1/1694* (2013.01); *H04N 21/41407* (2013.01);
(Continued)

(58) Field of Classification Search
CPC ........ H04N 7/142; H04N 7/147; H04N 7/148; H04N 5/64; H04N 5/23229;
(Continued)

(56) References Cited

U.S. PATENT DOCUMENTS

2005/0122311 A1  6/2005 Lee et al.
2010/0118115 A1* 5/2010 Takahashi ............ H04N 21/854
348/24

FOREIGN PATENT DOCUMENTS

CN          103226453 A      7/2013
CN          104581405 A      4/2015
(Continued)

OTHER PUBLICATIONS

First Office Action in counterpart Chinese Patent Application No. 201911145223.6, dated Aug. 28, 2020.
(Continued)

*Primary Examiner* — Samira Monshi
(74) *Attorney, Agent, or Firm* — Westbridge IP LLC

(57) ABSTRACT

Disclosed is a method of controlling a horizontal screen or a vertical screen of a television. The method includes the following operations of: acquiring a mode of a television, and judging whether the mode is a mobile phone mode; in response that the television is in the mobile phone mode, acquiring an image to be displayed, and playing the image in the vertical screen according to a vertical state of the image. The disclosure further discloses a device of controlling a horizontal screen or a vertical screens of a television, and a computer readable storage medium.

17 Claims, 9 Drawing Sheets

(51) Int. Cl.
　　　*G06F 1/16*　　　　(2006.01)
　　　*H04N 21/43*　　　(2011.01)
(52) U.S. Cl.
　　　CPC . *H04N 21/4307* (2013.01); *G06F 2200/1614*
　　　　　　(2013.01); *G06F 2200/1637* (2013.01)
(58) Field of Classification Search
　　　CPC .......... H04N 5/23245; H04N 5/23258; H04N
　　　　　　　5/2352; H04N 5/2353; H04N 5/2621;
　　　　　　H04N 19/12; H04N 19/124; H04N 19/18;
　　　　　　　H04N 19/36; H04N 19/60; H04N 19/85
　　　See application file for complete search history.

(56) References Cited

FOREIGN PATENT DOCUMENTS

| | | | |
|---|---|---|---|
| CN | 106888312 | A | 6/2017 |
| CN | 107071551 | A | 8/2017 |
| CN | 109814828 | A | 5/2019 |
| CN | 110086938 | A | 8/2019 |
| CN | 110996175 | A | 4/2020 |
| KR | 101218295 | B1 | 1/2013 |

OTHER PUBLICATIONS

First Office Action in counterpart Chinese Patent Application No. 201911145223.6, dated Mar. 9, 2021.
International Search Report and Written Opinion in corresponding PCT Application No. PCT/CN2020/129851, dated Feb. 18, 2021.

\* cited by examiner horizontal screen use

METHOD OF CONTROLLING A HORIZONTAL SCREEN OR VERTICAL SCREEN OF TELEVISION, DEVICE, AND STORAGE MEDIUM

CROSS REFERENCE TO RELATED APPLICATIONS

The present application is a continuation of International Application No. PCT/CN2020/129851 filed on Nov. 18, 2020, which claims the priority of the Chinese patent application filed on Nov. 19, 2019, with the application number of 201911145223.6 and the title of "Method of controlling a horizontal screen or vertical screen of television, device, and storage medium". The disclosures of the aforementioned applications are hereby incorporated by reference in their entireties.

TECHNICAL FIELD

The disclosure relates to the field of television interaction, in particular to a method, a device and a computer readable storage medium for controlling a horizontal or a vertical screen of a television.

BACKGROUND

Science and technology have brought instant video and instant video software as being a new favorite to people. Relying on the popularity of smart phones and the optimized coverage of 4G networks, increasing mobile Internet users have become viewers of instant videos, which have developed rapidly in a short time.

However, because of small operational interface of the mobile phone, watching instant videos on mobile phones can not provide users with an excellent viewing experience. Instant videos such as Tiktok and Kuaishou are vertical screen playing images, bother the users as they can not well reflect the playing effect on horizontal TV sets.

SUMMARY

The main purpose of the present disclosure is to provide a method of controlling a horizontal screen or a vertical screen of a television, a device and a computer readable storage medium, aiming at enabling a television system to play vertical screen videos.

In order to achieve the above purpose, the present disclosure provides a method for controlling the horizontal screen or a vertical screen of a television, which includes the following operations:

acquiring a mode of the television, and judging if the television is in a mobile phone mode;

in response that the television is in the mobile phone mode, acquiring an image to be displayed, and playing the image in the vertical screen according to a vertical state of the image.

In an embodiment, a method of controlling a horizontal or a vertical screen of a television includes:

in response that the television is not in the mobile phone mode, playing the image in the horizontal screen under a TV mode.

In an embodiment, prior to the operation of acquiring an image to be displayed, the method further includes:

sending an instruction to the mobile terminal for request to project a screen, and receiving a result of the request returned by the mobile terminal; and in response that the result is "confirm", acquiring the image to be displayed sent by the mobile terminal.

In an embodiment, the operation of acquiring an image to be displayed, includes:

in response that the result is "cancel", displaying corresponding prompt information on a screen of the television.

In one embodiment, prior to the operation of sending an instruction to the mobile terminal for request to project a screen, and receiving a result of the request returned by the mobile terminal, the method includes:

detecting an external connection for the television through a communication protocol;

in response that the external connection is on, sending an instruction to the mobile terminal for request to project a screen, and receiving a result of the request returned by the mobile terminal.

In one embodiment, prior to the operation of sending an instruction to the mobile terminal for request to project a screen, and receiving a result of the request returned by the mobile terminal, the method includes:

in response that the external connection is off, displaying corresponding prompt information on a screen of the television.

In an embodiment, after the operation of acquiring an image to be displayed, and playing the image in the vertical screen according to a vertical state of the image, the method includes:

acquiring a screen state of the television;

judging whether the screen state of the television is consistent with a screen state of the image to be displayed;

in response that the screen state of the television is inconsistent with the screen state of the image to be displayed, adjusting the screen state of the TV to be consistent with the screen state of the image to be displayed.

In an embodiment, after the operation of adjusting the screen state of the TV to be consistent with the screen state of the image to be displayed, the method further includes:

receiving a control instruction sent by a mobile phone contact; and executing a corresponding control operation on the corresponding contact of the television according to the control instruction.

In addition, in order to achieve the above purpose, the present disclosure further provides a device of controlling a horizontal screen or vertical screen of a television. The device includes: a memory, a processor and one or more programs for controlling a horizontal screen or vertical screen of a television stored in the memory and executable on the processor, and when executed by the processor, the programs implement the operations as described above.

In addition, in order to achieve the above purpose, this disclosure further provides a computer readable storage medium, on which one or more program for controlling a horizontal screen or a vertical screen of a television is stored, and when the programs for controlling the horizontal screen or the vertical screen of a television is executed by a processor, the operations of the above method for controlling a horizontal screen or a vertical screen of a television are implemented.

The disclosure provides a method of controlling a horizontal screen or vertical screen of a television, a device, and a computer storage medium. The method comprises the following operations of: acquiring a mode of a television, and judging whether the mode is a mobile phone mode; in response that the television is in the mobile phone mode, acquiring an image to be displayed, and playing the image in the vertical screen according to a vertical state of the image. As such, the disclosure can play the vertical screen corresponding to the TV screen according to the image to be displayed on the TV. The user can not only play the horizontal screen on the TV, but further play the vertical screen according to the TV content, improving the user's viewing experience and providing the user with a better visual effect.

The implementation, functional characteristics and advantages of the present application will be further described with reference to the attached drawings in combination with embodiments.

DETAILED DESCRIPTION OF THE EMBODIMENTS

It should be understood that the specific embodiments described herein are only for illustrative purpose and are not intended to limit the present application.

Figure 1:
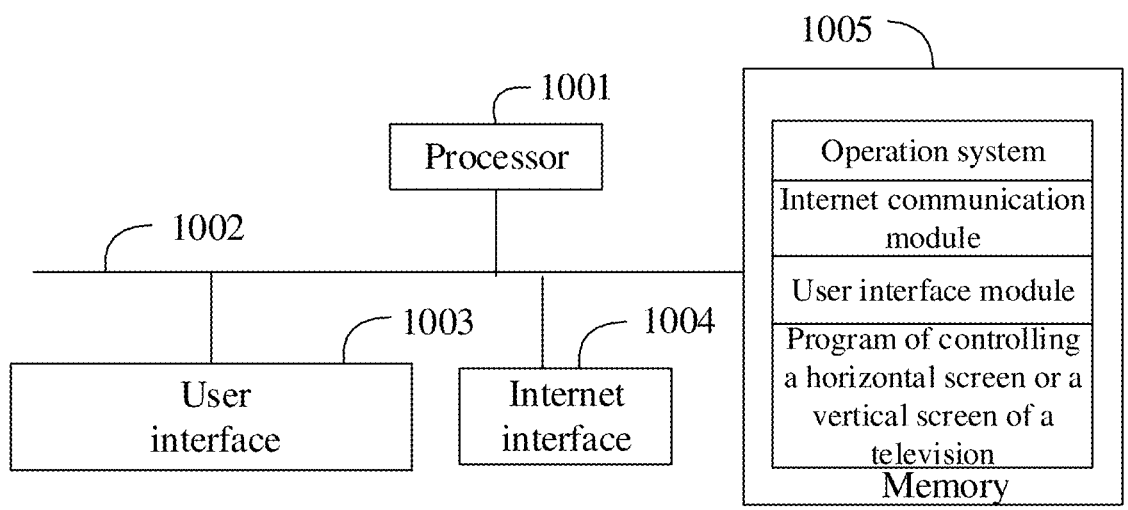
FIG. 1 is a structural schematic diagram of a hardware operating environment according to some embodiments of the present application.

As shown in FIG. 1, which is a structural schematic diagram of a hardware operating environment according to some embodiments of the present application The terminal of the embodiment of the disclosure can be a PC, or a terminal device with data processing function such as a smart phone, a tablet computer, a portable computer, etc.

As shown in FIG. 1, the terminal may include a processor 1001, such as a CPU, a network interface 1004, a user interface 1003, a memory 1005, and a communication bus 1002. In which, the communication bus 1002 is configured to implement connection and communication between these components. The user interface 1003 may include a display, an input unit such as a keyboard, and the user interface 1003 may optionally further include a standard wired interface and a wireless interface. The network interface 1004 may optionally include a standard wired interface and a wireless interface (such as a WI-FI interface). The memory 1005 may be a high speed RAM memory or a non-volatile memory such as a disk memory. The memory 1005 may alternatively be a storage device independent of the aforementioned processor 1001, In an embodiment, the terminal may further include a camera, RF (Radio Frequency) circuits, sensors, audio circuits, WiFi modules, etc. The sensors may include light sensors, motion sensors and others. Specifically, the light sensors can include an ambient light sensor and a proximity sensor, wherein the ambient light sensor can adjust the brightness of the display screen according to the brightness of ambient light, and the proximity sensor can turn off the display screen and/or backlight when the mobile terminal moves to the ear. As a kind of motion sensor, the gravity acceleration sensor can detect the magnitude of acceleration in all directions (generally three axes), and when stationary, it can detect the magnitude and direction of gravity, which can be used to identify mobile terminal posture applications (such as horizontal and vertical screen switching, related games, magnetometer posture calibration), vibration identification related functions (such as pedometer, tapping), etc. Of course, the mobile terminal can also be equipped with gyroscopes, barometers, hygrometers, thermometers, infrared sensors and other sensors, which will not be described herein.

It would be understood by those skilled in the art that the terminal shown in FIG. 1 does not constitute a limitation to the terminal, which may include more or fewer components than shown, or some components may be combined, or different components arranged.

As shown in FIG. 1, the memory 1005 as a computer storage medium may include an operating system, a network communication module, a user interface module, and a program of controlling a horizontal screen or a vertical screen of a television.

In the terminals shown in FIG. 1, the network interface 1004 is mainly configured to connect with a back-end server and perform data communication with the back-end server. The user interface 1003 is mainly configured to connect the client (user end) and perform data communication with the client end; while the processor 1001 can be configured to call the program of controlling a horizontal screen or a vertical screen of a television stored in the memory 1005 and execute the following operations:

acquiring a mode of the television, and judging if the television is in a mobile phone mode;

in response that the television is in the mobile phone mode, acquiring an image to be displayed, and playing the image in the vertical screen according to a vertical state of the image.

Further, the processor 1001 may call the program of controlling a horizontal screen or a vertical screen of a television stored in the memory 1005, and implement the following operations:

where a method of controlling a horizontal screen or a vertical screen of a television includes:

in response that the television is not in the mobile phone mode, playing the image in the horizontal screen under a TV mode.

Further, the processor 1001 may call the program of controlling a horizontal screen or a vertical screen of the television stored in the memory 1005, and implement the following operations:

prior to the operation of acquiring an image to be displayed, the method further includes:

sending an instruction to a mobile terminal for request to project a screen, and receiving a result of the request returned by the mobile terminal; and in response that the result is "confirm", acquiring the image to be displayed sent by the mobile terminal.

Further, the processor 1001 may call the program of controlling a horizontal screen or a vertical screen of a television stored in the memory 1005, and implement the following operations:

the operation of acquiring an image to be displayed further includes:

in response that the result is "cancel", displaying corresponding prompt information on a screen of the television.

Further, the processor 1001 may call the program of controlling a horizontal screen or a vertical screen of a television stored in the memory 1005, and implement the following operations:

prior to the operation of sending an instruction to the mobile terminal for request to project a screen, and receiving a result of the request returned by the mobile terminal, the method includes:

detecting an external connection for the television through a communication protocol;

in response that the external connection is on, sending the instruction to the mobile terminal for request to project a screen, and receiving the result of the request returned by the mobile terminal.

Further, the processor 1001 may call the program of controlling a horizontal screen or a vertical screen of a television stored in the memory 1005, and implement the following operations:

prior to the operation of sending an instruction to the mobile terminal for request to project a screen, and receiving a result of the request returned by the mobile terminal, the method includes:

in response that the external connection is off, displaying corresponding prompt information on the screen of the television.

Further, the processor 1001 may call the program of controlling a horizontal screen or a vertical screen of a television stored in the memory 1005, and implement the following operations:

after the operation of acquiring an image to be displayed, and playing the image in the vertical screen according to a vertical state of the image, the method includes:

acquiring a screen state of the television;

judging whether the screen state of the television is consistent with a screen state of the image to be displayed;

in response that the screen state of the television is inconsistent with the screen state of the image to be displayed, adjusting the screen state of the TV to be consistent with the screen state of the image to be displayed.

Further, the processor 1001 may call the program of controlling a horizontal screen or a vertical screen of a television stored in the memory 1005, and implement the following operations:

after the operation of adjusting the screen state of the TV to be consistent with the screen state of the image to be displayed, the method further includes:

receiving a control instruction sent by a mobile phone contact; and executing a corresponding control operation on a corresponding contact of the television according to the control instruction.

The specific embodiments of the device of controlling a horizontal screen or a vertical screen of a television in this disclosure are basically the same as the following embodiments of the method of controlling a horizontal screen or a vertical screen of a television, and will not be described in detail herein.

Figure 2:
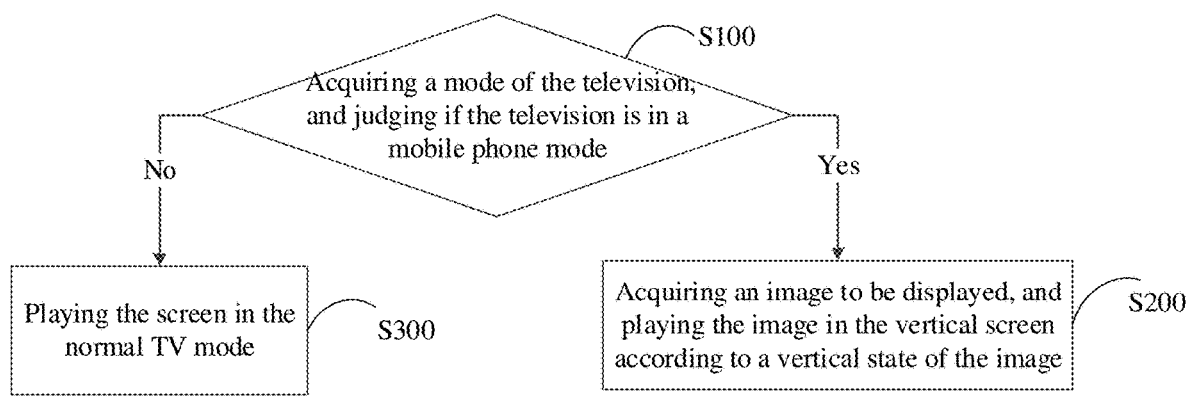
FIG. 2 is a schematic flow chart of a method of controlling a horizontal screen or a vertical screen of a television according to a first embodiment of the present disclosure.

FIG. 2 is referred to, which is a schematic flow chart of a method of controlling a horizontal screen or a vertical screen of a television according to a first embodiment of the present disclosure. The method includes:

operation S100, acquiring a mode of the television, and judging if the television is in a mobile phone mode.

The TV in the method of this disclosure can be set to switch between the horizontal and vertical screens. For example, the rotation can be triggered by operating a rotation button, or any other equivalent means. There is a rotation structure at the back of the TV, configured to rotate the TV screen. The rotating structure can be a rotation screw, a rotatable bracket or other structures. A TV can have a normal TV system for horizontal screen display and a vertical screen system that can be switched to from the horizontal screen system. That is, it enables two systems, and in some other cases, it can only have a vertical screen system. In the present embodiment, the mode of the TV is acquired, and it is judged whether the mode is a mobile phone mode. Mobile phone mode is a mode that allows horizontal and vertical screens. That is, in this mode, the TV can play the image and rotate between horizontal and vertical screens.

In response that the television is in the mobile phone mode, operation S200 would be implemented: acquiring an image to be displayed, and playing the image in the vertical screen according to a vertical state of the image.

When determining that the current mode of the TV is the mobile phone mode, the image to be displayed is acquired, and the corresponding horizontal screen or vertical screen are played according to the horizontal and vertical screen states of the displayed image. The image to be displayed can be a display image projected by a mobile phone connected with TV control or a display image projected by devices such as Ipad connected with TV control. Or it can be a display screen triggered by some software in the television system. After the TV acquires the image to be displayed, it can be determined whether the TV performs the corresponding horizontal and vertical screen rotation according to the horizontal or vertical screen state of the image. If the image to be displayed is a video of Tiktok, which is a vertical image, and the TV is a horizontal screen. Then the TV is to be rotated to a vertical screen, and the Tiktok video is played on the vertical screen.

Further, in response that the television is not in the mobile phone mode, playing the image in the horizontal screen under a TV mode.

Figure 8:
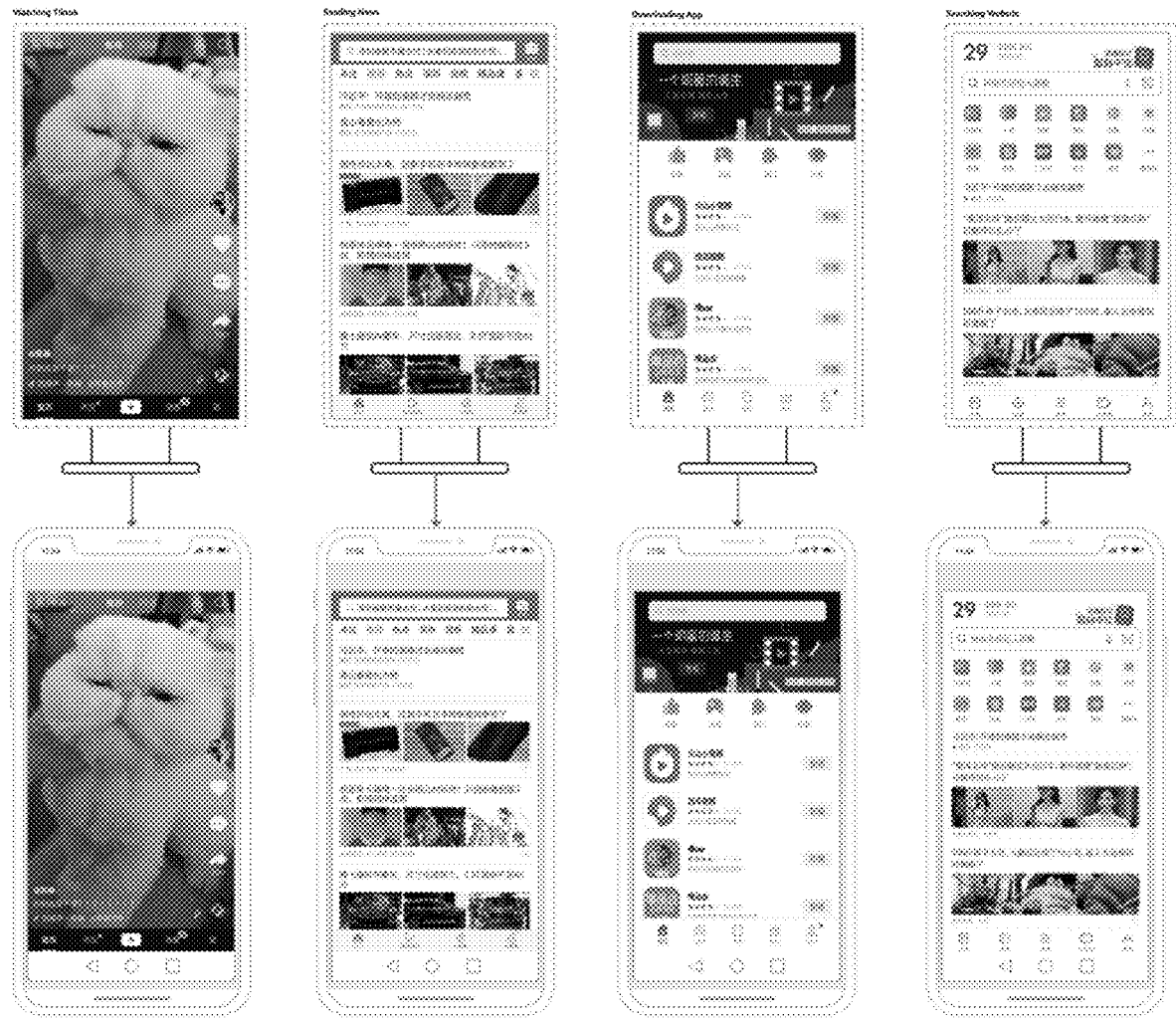
FIG. 8 is a diagram showing a display effect of the method of controlling a horizontal screen or a vertical screen of a television according to the first embodiment of the present disclosure.
Figure 9:
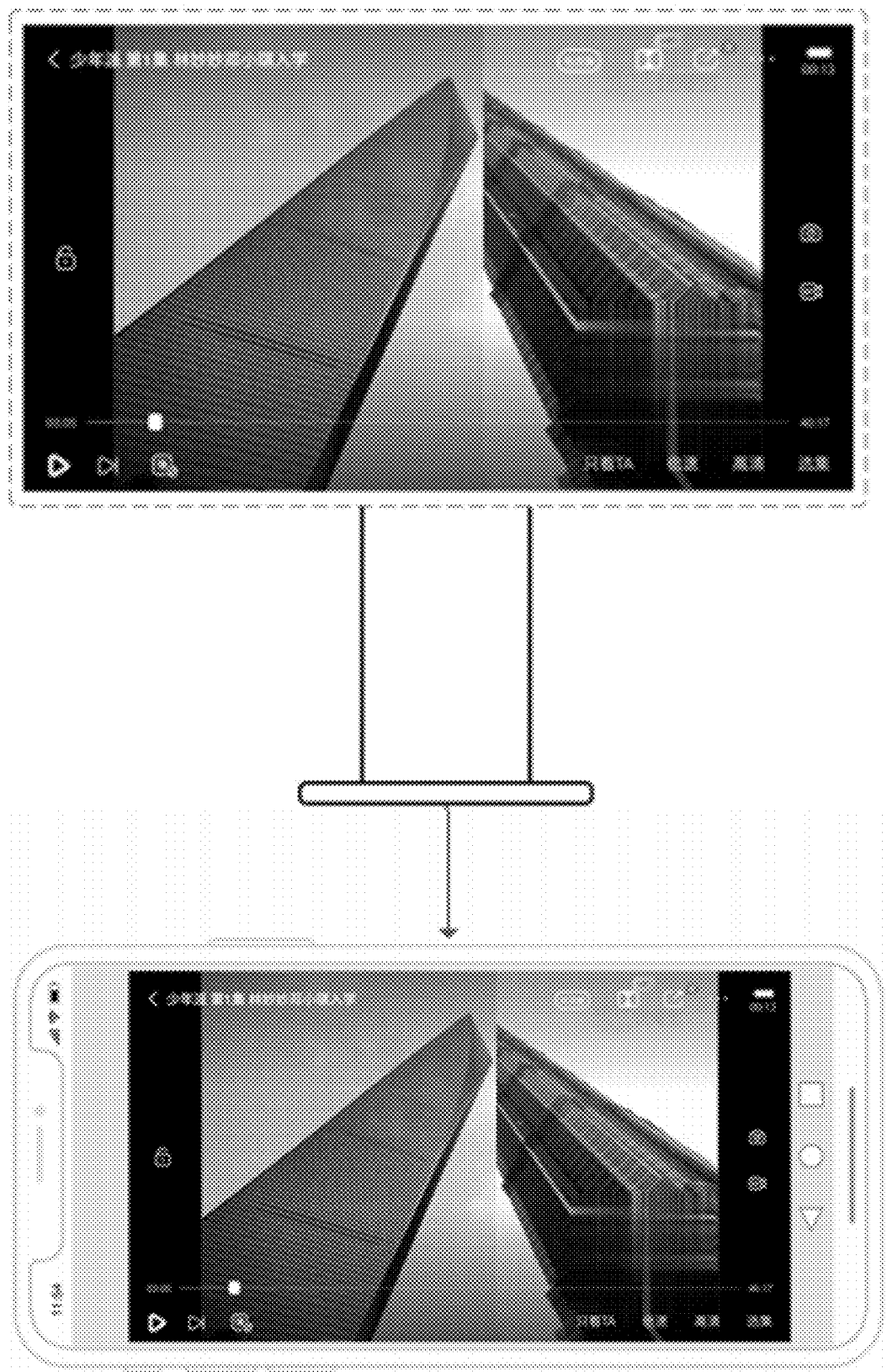
FIG. 9 is another diagram showing the display effect of the method of controlling a horizontal screen or a vertical screen of a television according to the first embodiment of the present disclosure.

If it is determined that the current mode of TV is not the mobile phone mode, but the normal TV mode, it is directly played in the horizontal screen in this mode. The normal TV mode is the normal state of the existing TVs. That is, the TV mode is a mode that cannot rotate between the horizontal and vertical screens. If it is detected that the mobile phone is not a mobile phone mode and is in the normal TV mode, the TV image will be directly played horizontally. Of course, if the TV has only one mode, such as a mode for only vertical screens, it is not necessary to judge the mode of TV. The image to be displayed would be directly acquired, and the corresponding horizontal screen or vertical screen would be played according to the horizontal or vertical screen state of the image to be displayed. Detailed information can be found in FIG. 8 and FIG. 9 regarding the specific display effect. At the top of the image is the display screen of the TV terminal, and at the bottom is the display screen of the mobile phone terminal. TV and mobile phone keep the same vertical or horizontal screen play. When the mobile phone has a vertical screen, the TV would play on the corresponding vertical screen, and when the mobile phone has a horizontal screen, the TV would play on the corresponding horizontal screen.

The disclosure provides a method of controlling a horizontal screen or a vertical screen of a television, a device, and a computer storage medium. The method includes the following operations of: acquiring a mode of a television, and judging whether the mode is a mobile phone mode; in response that the television is in the mobile phone mode, acquiring an image to be displayed, and playing the image in the horizontal or vertical screen according to a horizontal or vertical state of the image. As such, the disclosure can play the horizontal or vertical screen corresponding to the TV screen according to the image to be displayed on the TV. The user can not only play the horizontal screen on the TV, but further play the vertical screen according to the TV content, improving the user's viewing experience and providing the user with a better visual effect.

Figure 3:
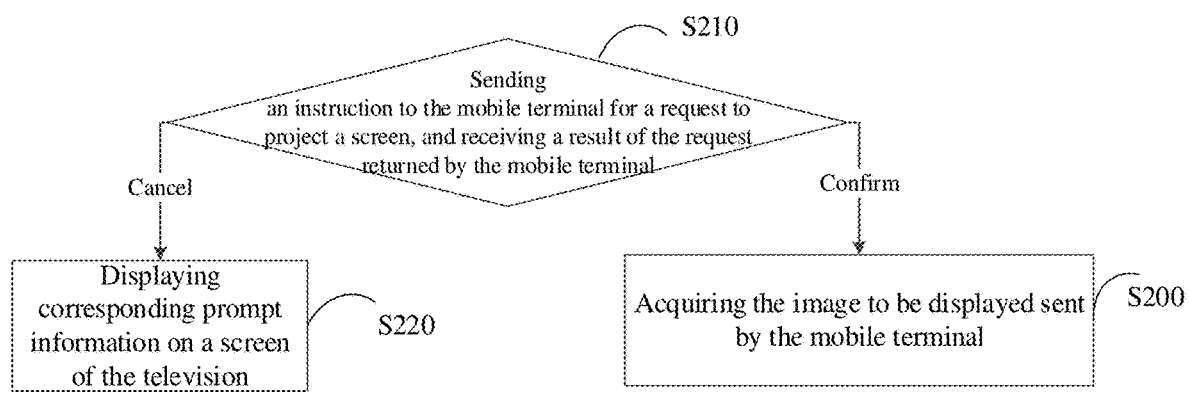
FIG. 3 is a schematic flow chart of the method of controlling a horizontal screen or a vertical screen of a television according to a second embodiment of the present disclosure.

FIG. 3 is referred to, which is a schematic flow chart of the method of controlling a horizontal screen or a vertical screen of a television according to a second embodiment of the present disclosure.

Based on the above embodiments, in the present embodiment, before operation S200, the method includes:

operation S210, sending an instruction to the mobile terminal for request to project a screen, and receiving a result of the request returned by the mobile terminal; and In the present embodiment, before acquiring the image to be displayed and playing the corresponding horizontal screen or vertical screen according to the horizontal or vertical screen state of the image to be displayed, an instruction for request to screen projection may be sent to the mobile terminal and the result returned by the mobile terminal may be received. The mobile terminal can be a mobile phone, an iPad or another mobile device. The screen projection can be unidirectional screen projection of mobile phone to TV, or bidirectional screen projection between mobile phone and TV. The screen projection and other technical operations can be implemented according to the private protocol of reverse screen projection, wireless transmission network server, encryption algorithm, streaming media protocol support, P2P Group Owner technology of WIFI-P2P, wifi-direct device discovery protocol and other technologies. binary screen projection of TV and mobile phones can give users a better control of screen projection.

in response that the result is "confirm", operation S200 would be implemented: acquiring the image to be displayed sent by the mobile terminal.

If the result of the screen projection request is to confirm the screen projection, the display screen sent by the mobile terminal is acquired, and the subsequent operation is performed: the corresponding horizontal screen or vertical screen is played according to the horizontal or vertical screen state of the image to be displayed.

Further, in response that the result is "cancel", operations S220 is implemented: displaying corresponding prompt information on a screen of the television.

In response that the result is "cancel", corresponding prompt information is displayed on a screen of the television. Prompt information such as "no corresponding screen projection equipment can be found", etc.

Figure 4:
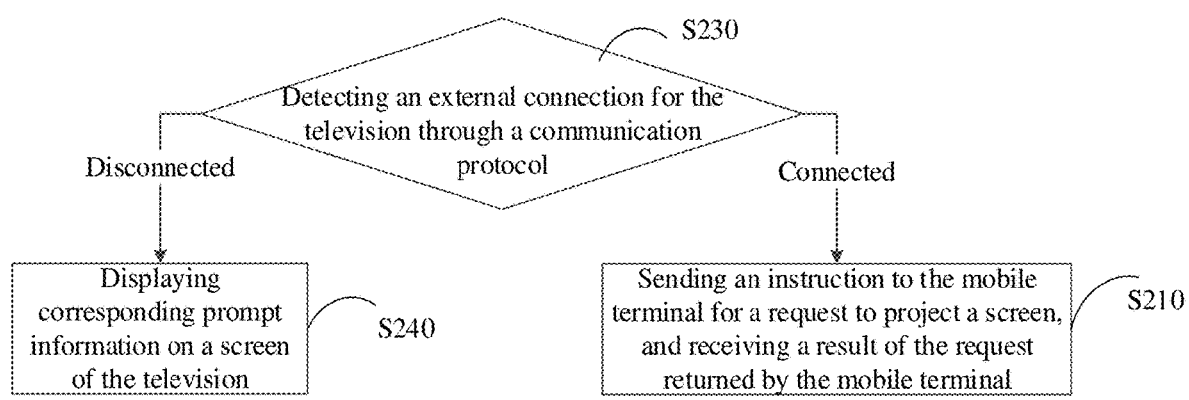
FIG. 4 is a schematic flow chart of the method of controlling a horizontal screen or a vertical screen of a television according to a third embodiment of the present disclosure.

FIG. 4 is referred to, which is a schematic flow chart of the method of controlling a horizontal screen or a vertical screen of a television according to a third embodiment of the present disclosure.

Based on the above embodiments, in the present embodiment, before operation S210, the method includes:

operation S230, detecting an external connection for the television through a communication protocol;

In the present embodiment, before sending the instruction to the mobile terminal and receiving the result returned by the mobile terminal, the external connection of the television can further be detected through the communication protocol, such as whether there are connected external mobile terminals or which external mobile terminals are connected.

in response that the external connection is on, operation S210 is implemented: sending an instruction to the mobile terminal for request to project a screen, and receiving a result of the request returned by the mobile terminal.

In response that the external connection is on, an instruction is sent to the mobile terminal for request to project a screen, and a result of the request is received returned by the mobile terminal. When there are multiple mobile terminals interconnected, the user can select which equipment to send the instruction to request the projection, so as to send the instruction to the equipment selected by the user and receive the corresponding result returned by the mobile terminal. The connection between external devices and TV can be wifi wireless connection, wired connection or other connections.

In response that the external connection is off, operation S240 is implemented: displaying corresponding prompt information on a screen of the television.

Figure 7:
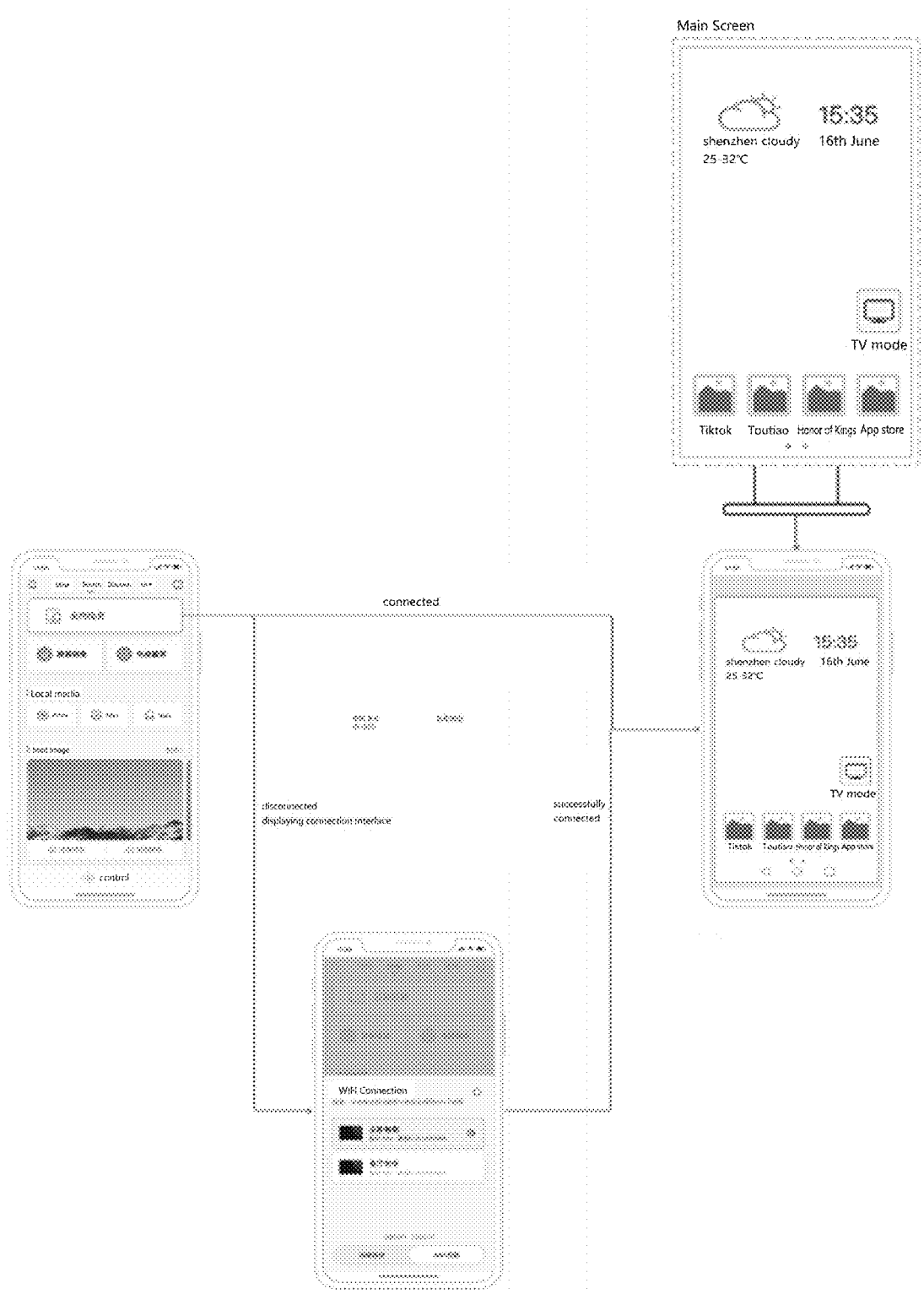
FIG. 7 is a diagram showing a connection of the method of controlling a horizontal screen or a vertical screen of a television according to the third embodiment of the present disclosure.

In response that the external connection is off, corresponding prompt information is displayed on a screen of the television. Such as prompt information "no connected external device is detected" and etc. Specifically, as shown in FIG. 7, when the mobile phone is connected to the TV via WIFI, it can perform corresponding screen projection on the TV, and the TV will play the image vertically according to the projected image.

Figure 5:
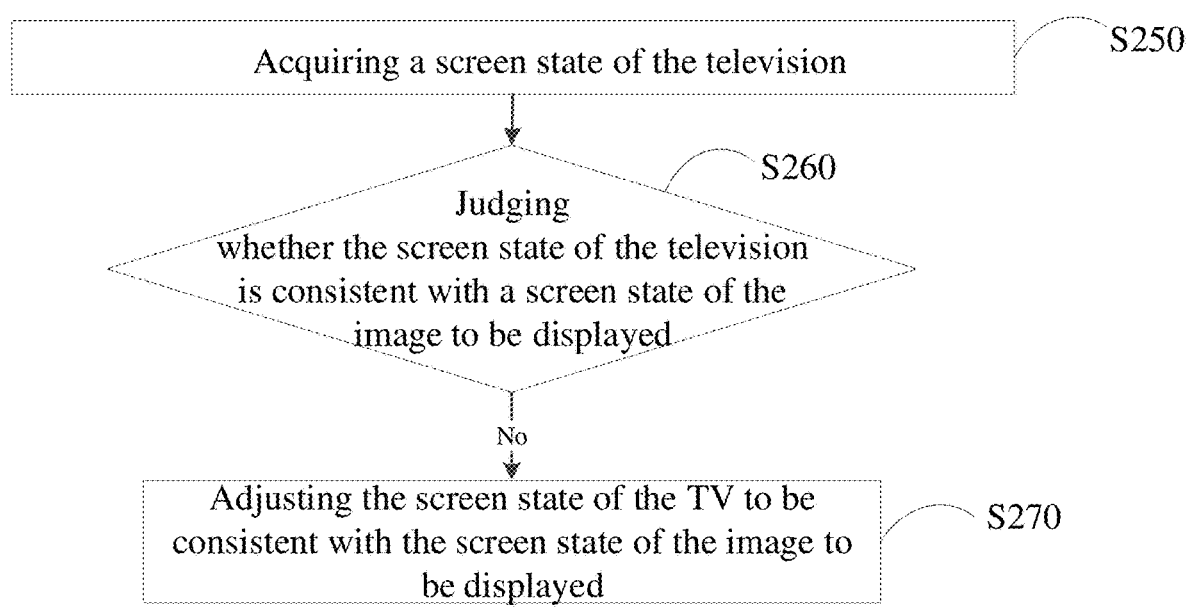
FIG. 5 is a schematic flow chart of the method of controlling a horizontal screen or a vertical screen of a television according to a fourth embodiment of the present disclosure.

FIG. 5 is referred to, which is a schematic flow chart of the method of controlling a horizontal screen or a vertical screen of a television according to a fourth embodiment of the present disclosure.

Based on the above embodiments, in the present embodiment, operation S200 includes:

operation S250, acquiring a screen state of the television.

In the present embodiment, the image to be displayed is acquired and the corresponding horizontal screen or vertical screen is played according to the horizontal or vertical screen state of the image to be displayed. And the horizontal and vertical screen state of the TV can be acquired first, such as the horizontal screen state of the current TV or the vertical screen state of the current TV.

Operation S260, judging whether the screen state of the television is consistent with a screen state of the image to be displayed.

After acquiring the horizontal or vertical screen state of TV, it can be judged whether the current horizontal or vertical screen state is consistent with the horizontal or vertical screen state of the image to be displayed. If the state of TV is horizontal screen and the image to be displayed is vertical screen, the screen state of TV is inconsistent with that of the image to be displayed.

In response that the screen state of the television is inconsistent with the screen state of the image to be displayed, operation S270 is implemented: adjusting the screen state of the TV to be consistent with the screen state of the image to be displayed.

If the state of TV is inconsistent with that of the image to be displayed, the horizontal or vertical screen state of TV is adjusted to be consistent with that of the image to be displayed. If the horizontal and vertical screen state of TV is horizontal and the image to be displayed is vertical, the screen state of TV is not consistent with that of the image to be displayed.

Figure 6:
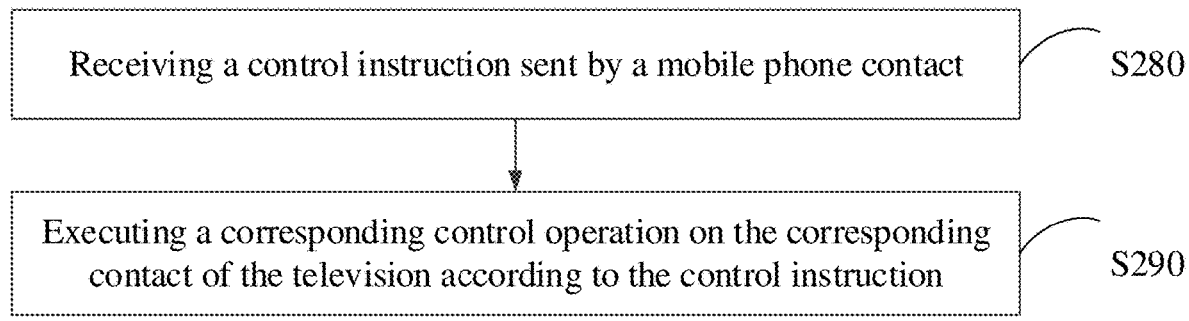
FIG. 6 is a schematic flow chart of the method of controlling a horizontal screen or a vertical screen of a television according to a fifth embodiment of the present disclosure.

FIG. 6 is referred to, which is a schematic flow chart of the method of controlling a horizontal screen or a vertical screen of a television according to a fifth embodiment of the present disclosure.

Based on the above embodiments, in the present embodiment, after operation S200, the method includes:

operation S280, receiving a control instruction sent by a mobile phone contact.

In the present embodiment, after the operation of acquiring an image to be displayed, and playing the image in the vertical screen according to a vertical state of the image, the control instruction can be received from the mobile phone contact, such as the control instruction of opening a certain software, can further be received.

Operation S290, executing a corresponding control operation on the corresponding contact of the television according to the control instruction.

After receiving the control instruction sent by the contact of the mobile phone, the TV performs the corresponding control operation on the corresponding contact of the TV according to the control instruction. For example, it can be opening a certain software at the corresponding point. The TV screen and the mobile phone screen can be projected mutually, and when operation such as sliding and clicking on the projected screen is conducted, the TV terminal would respond correspondingly to the operation. The one-to-one correspondence between contacts of TV screen and mobile phone screen can be implemented combined with private protocol. The contacts on mobile phone and TV can be controlled in one-to-one correspondence, and the mobile phone can be used to control TV to play the mobile phone image vertically. The requirement of the user to play video social media or games on TV can be fully fulfilled, and a better usage effect can be achieved.

In addition, the embodiment of the present disclosure further provides a computer readable storage medium.

A computer readable storage medium of the present disclosure stores one or more programs of controlling a horizontal screen or a vertical screen of a television, and when the program of controlling a horizontal screen or a vertical screen of a television is executed by a processor, the operations of the method of controlling a horizontal screen or a vertical screen of a television are implemented.

In which, the method implemented when the programs running on the processor for controlling a horizontal screen or a vertical screen of a television is executed can refer to each embodiment of the method of controlling a horizontal screen or a vertical screen of a television in this disclosure, which is not repeated herein.

It should be noted that in this document, the terms "comprising", "including" or any other variation thereof are intended to cover a non-exclusive inclusion, such that a process, method, article, or system that includes a list of elements includes not only those elements but further other elements not expressly listed, or elements inherent to such process, method, article, or system. Without further restrictions, an element defined by the statement "includes an" does not exclude the presence of another identical element in a process, method, article, or system including the element.

The aforementioned serial numbers regarding the embodiments of the present application are for description only and do not represent the superiority and inferiority of the embodiments.

From the above description of the embodiments, those skilled in the art can clearly understand that the method of the above embodiments can be implemented by means of software plus necessary general-purpose hardware platforms. Of course, it can also be implemented by means of hardware, but in many cases the former is a better embodiment. Based on this understanding, the technical solution of the present application, in essence, or the part contributing to the prior art, can be embodied in the form of a software product stored in a storage medium (such as a ROM/RAM, a magnetic disk, a diskette) as described above, including several instructions to cause a terminal device (which can be a mobile phone, a computer, a server, an air conditioner, or a network device, etc.) to perform the methods described in various embodiments of the present application.

The description aforementioned is only the optional embodiment of the present application and is not intended to limit the scope of the present application. Any equivalent structural or flow modification made by using the description and drawings of the present application or direct/indirect application in other related technical fields under the concept of the present application shall be included in the protection scope of the present application.

What is claimed is:

1. A method of controlling a horizontal screen or a vertical screen of a television, comprising:
   acquiring a mode of the television, and judging if the television is in a mobile phone mode;
   in response that the television is in the mobile phone mode, acquiring an image to be displayed, and playing the image in the vertical screen according to a vertical state of the image;
   wherein prior to the operation of acquiring an image to be displayed, the method further comprises:
   sending an instruction to the mobile terminal for request to project a screen, and receiving a result of the request returned by the mobile terminal; and
   in response that the result is "confirm", acquiring the image to be displayed sent by the mobile terminal.

2. The method according to claim 1, wherein the method further comprises:
   in response that the television is not in the mobile phone mode, playing the image in the horizontal screen under a normal TV mode.

3. The method according to claim 1, wherein the operation of acquiring an image to be displayed, comprises:
   in response that the result is "cancel", displaying corresponding prompt information on a screen of the television.

4. The method according to claim 1, wherein prior to the operation of sending an instruction to the mobile terminal for request to project a screen, and receiving a result of the request returned by the mobile terminal, the method further comprises:
   detecting an external connection for the television through a communication protocol;

in response that the external connection is on, sending the instruction to the mobile terminal for request to project a screen, and receiving the result of the request returned by the mobile terminal.

5. The method according to claim 4, wherein prior to the operation of sending an instruction to the mobile terminal for request to project a screen, and receiving a result of the request returned by the mobile terminal, the method further comprises:
   in response that the external connection is off, displaying corresponding prompt information on a screen of the television.

6. The method according to claim 1, wherein after the operation of acquiring an image to be displayed, and playing the image in the vertical screen according to a vertical state of the image, the method comprises:
   acquiring a screen state of the television;
   judging whether the screen state of the television is consistent with a screen state of the image to be displayed;
   in response that the screen state of the television is inconsistent with the screen state of the image to be displayed, adjusting the screen state of the TV to be consistent with the screen state of the image to be displayed.

7. The method according to claim 1, wherein after the operation of adjusting the screen state of the TV to be consistent with the screen state of the image to be displayed, the method further comprises:
   receiving a control instruction sent by a mobile phone contact; and
   executing a corresponding control operation on a corresponding contact of the television according to the control instruction.

8. A device of controlling a horizontal screen or a vertical screen of a television, wherein the device comprises: a memory, a processor and a program of controlling a horizontal screen or a vertical screen of a television stored in the memory and executable on the processor, and when executed by the processor, the program implements the following operations:
   acquiring a mode of the television, and judging if the television is in a mobile phone mode;
   in response that the television is in the mobile phone mode, acquiring an image to be displayed, and playing the image in the vertical screen according to a vertical state of the image;
   wherein prior to the operation of acquiring an image to be displayed, the programs further implement the following operations:
   sending an instruction to the mobile terminal for request to project a screen, and receiving a result of the request returned by the mobile terminal; and
   in response that the result is "confirm", acquiring the image to be displayed sent by the mobile terminal.

9. The device according to claim 8, wherein the programs further implement the following operations:
   in response that the television is not in the mobile phone mode, playing the image in the horizontal screen under a TV mode.

10. The device according to claim 8, wherein the operation of acquiring an image to be displayed, further comprises:
    in response that the result is "cancel", displaying corresponding prompt information on a screen of the television.

11. The device according to claim 8, wherein prior to the operation of sending an instruction to the mobile terminal for request to project a screen, and receiving a result of the request returned by the mobile terminal, the programs further implement the following operations:
    detecting an external connection for the television through a communication protocol;
    in response that the external connection is on, sending the instruction to the mobile terminal for request to project a screen, and receiving the result of the request returned by the mobile terminal.

12. The device according to claim 11, wherein prior to the operation of sending an instruction to the mobile terminal for request to project a screen, and receiving a result of the request returned by the mobile terminal, the programs further implement the following operations:
    in response that the external connection is off, displaying corresponding prompt information on a screen of the television.

13. The device according to claim 8, wherein after the operation of acquiring an image to be displayed, and playing the image in the vertical screen according to a vertical state of the image, the programs further implement the following operations:
    acquiring a screen state of the television;
    judging whether the screen state of the television is consistent with a screen state of the image to be displayed;
    in response that the screen state of the television is inconsistent with the screen state of the image to be displayed, adjusting the screen state of the TV to be consistent with the screen state of the image to be displayed.

14. The device according to claim 8, wherein after the operation of adjusting the screen state of the TV to be consistent with the screen state of the image to be displayed, the programs further implement the following operations:
    receiving a control instruction sent by a mobile phone contact; and
    executing a corresponding control operation on a corresponding contact of the television according to the control instruction.

15. A non-transitory computer-readable storage medium, wherein one or more programs for controlling a horizontal screen or a vertical screen of a television are stored on the non-transitory computer-readable storage medium, and when executed by a processor, the programs of controlling a horizontal screen or a vertical screen of a television implement the following operations:
    acquiring a mode of the television, and judging if the television is in a mobile phone mode;
    in response that the television is in the mobile phone mode, acquiring an image to be displayed, and playing the image in the vertical screen according to a vertical state of the image;
    wherein prior to the operation of acquiring an image to be displayed, the programs further implement the following operations:
    sending an instruction to the mobile terminal for request to project a screen, and receiving a result of the request returned by the mobile terminal; and
    in response that the result is "confirm", acquiring the image to be displayed sent by the mobile terminal.

16. The non-transitory computer readable storage medium according to claim 15, wherein the programs further implement the following operations:

in response that the television is not in the mobile phone mode, playing the image in the horizontal screen under a TV mode.

17. The non-transitory computer readable storage medium according to claim 15, wherein the operation of acquiring the image to be displayed comprises:
in response that the result is "cancel", displaying corresponding prompt information on a screen of the television.

* * * * *